Sept. 27, 1927.
V. M. WADE ET AL
1,643,356
CLUTCH MECHANISM
Filed Dec. 1, 1925
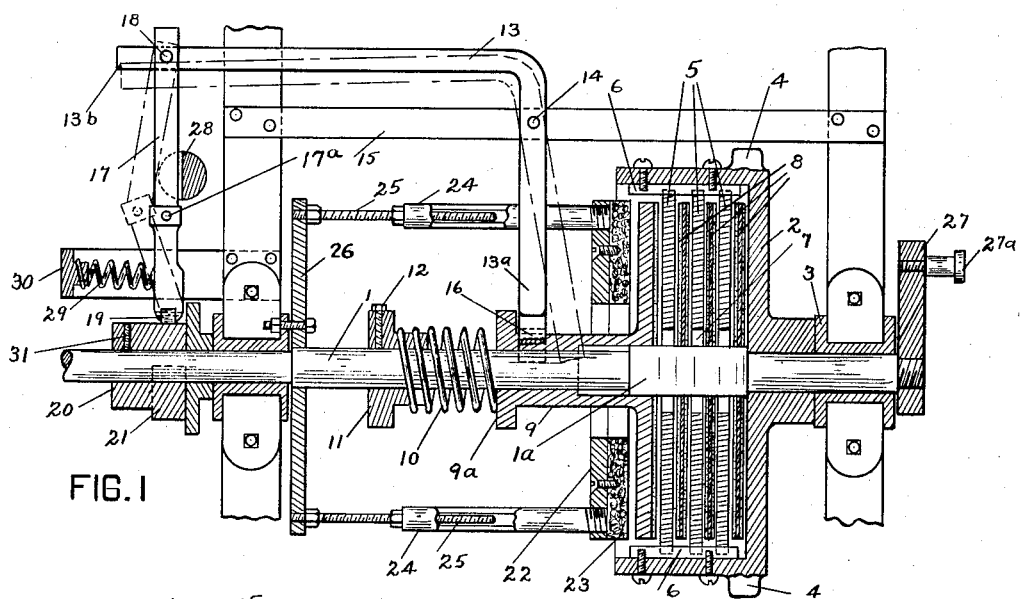
FIG. 1
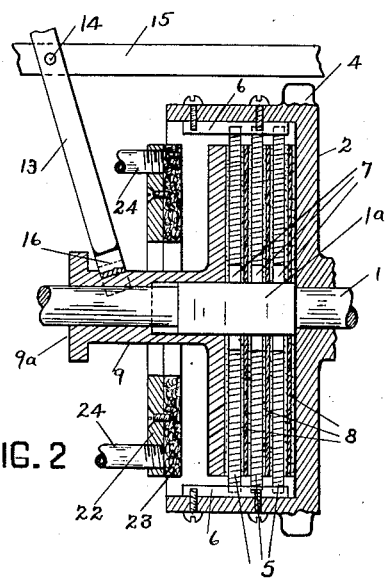
FIG. 2
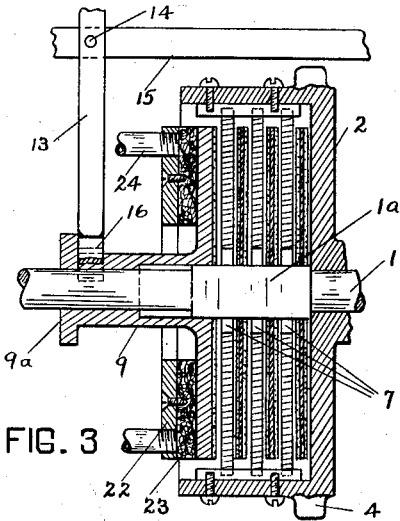
FIG. 3
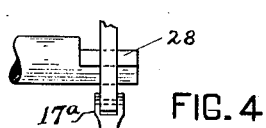
FIG. 4
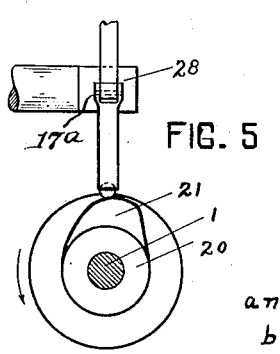
FIG. 5
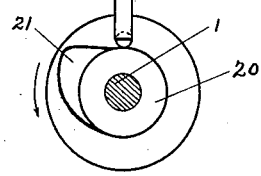
INVENTORS
Verner M. Wade
and Charles E. Zuspan
by William B. Wharton
their attorney Patented Sept. 27, 1927.

1,643,356

UNITED STATES PATENT OFFICE.

VERNER M. WADE AND CHARLES E. ZUSPAN, OF FAIRMONT, WEST VIRGINIA, ASSIGNORS TO FAIRMONT BOX COMPANY, OF FAIRMONT, WEST VIRGINIA, A CORPORATION OF NEW YORK.

CLUTCH MECHANISM.

Application filed December 1, 1925. Serial No. 72,519.

This invention relates to clutch mechanism.

The clutch shown and described herein is a friction clutch, and was invented primarily for use as an element in a partition assembling machine such as that described and claimed in copending application Serial No. 72,520 filed December 1st, 1925. Certain elements of the device however are susceptible of application to clutches of a different type, and the clutch as a whole is adapted for use in any connection in which it is important to secure a single or partial intermittent revolution of a shaft, in such manner that the action is abrupt and positive and revolution of the shaft is checked at the same point on its circumference after each revolution.

One object of the invention is to provide a clutch mechanism in which an intermittently rotated shaft is subjected to rotating movement which is abruptly checked at the completion thereof.

Another object of the invention is to provide clutch mechanism which is sensitive and instantaneous in producing each revolution of the shaft with which it is used.

A further object of the invention is to provide clutch mechanism having a take-up adjustment so that wearing of the parts may be compensated for and the instantaneous starting of the revolution of the shaft, and the abrupt cessation of the revolution thereof, maintained without replacement of the operating parts of the clutch.

A further object of the invention is to provide clutch mechanism comprising unitary and simple means for both withdrawing the clutch members from mutual engagement, and for withholding them therefrom.

In the drawings Figure 1 is a vertical sectional view through the clutch mechanism; Figure 2 is a fragmentary sectional view of the fixed and movable clutch members, and the operating connections immediately associated therewith, showing such operating connections in position to permit mutual engagement of the clutch members; Figure 3 is a similar view, but showing the operating connections in position to produce disengagement of the clutch members and to stop rotation of the shaft; Figure 4 is a detail front elevation of the tripping means for actuating the operating connections of the clutch mechanism, showing such means in position to render the operating connections inoperative and to permit mutual engagement of the clutch members as shown in Figure 2; Figure 5 is a detail front elevation of the same tripping means, but showing the same in position to actuate the operating connections for disengaging the clutch members and stopping rotation of the shaft, as shown in Figure 3.

In the drawings the reference numeral 1 indicates the shaft to which intermittent movement of rotation is to be imparted. A clutch member 2 in the form of a casing is mounted on the shaft 1 to rotate freely thereon. Movement of this clutch member axially of the shaft is prevented by the shoulder of a bearing 3 and by a shoulder on a squared portion $1^a$ of the shaft. Clutch member 2 is constantly rotated on the shaft 1 by any suitable means. As shown, the clutch member is provided with a sprocket 4 for the reception of a driving sprocket chain. A plurality of clutch disks 5, which are preferably metallic, are connected with the clutch member 2 by means of keys 6 in the clutch member and engaging keyways in the disks. These disks are thus free for axial movement relative to the shaft and to the clutch member. They have each a central aperture 7, so that they at no time come in contact with the squared portion $1^a$ of the shaft which they surround. Engaged by the squared portion $1^a$ of the shaft are a plurality of clutch disks 8 of suitable compressible material, such as asbestos composition or the like.

The movable clutch member 9 of the mechanism is slidably mounted on the shaft 1 and the squared portion $1^a$ thereof, and rotates with the shaft by its engagement with this squared portion. This movable clutch member 9 is provided with a collar $9^a$, against which bears a coiled spring 10. This coiled spring 10 also bears against a collar 11, which is rigidly secured to the shaft 1 by any suitable means such as a set screw 12.

Considering the mechanism as so far described; the coiled spring 10 acting on slidable clutch member 9, which rotates with the shaft 1, forces such clutch member against the disks in the freely rotatable member 2. Such action causes clutch disks 5 to slide along the keys 6, so that they compress the clutch disks 8 and form a temporary union therewith. Such action binds the rotating clutch member 2 to the shaft to produce rotation of the latter.

It is to be understood that the structure thus previously described is of usual form and arrangement in friction clutch construction.

The operating connections for producing mutual disengagement of the clutch members comprise an L shaped lever 13 pivoted at 14 on the clutch supporting structure 15 or on any suitable support. At its extremity the arm 13ᵃ of this lever carries a yoke 16 engaging the collar 9ᵃ on the slidable clutch member 9. Elevation of the extremity of the other arm 13ᵇ thus causes the lever to act as a bell crank, and by producing forward movement of the lower extremity of arm 13ᵃ to slide clutch member 9 away from engagement with the disks in member 2, against the resistance of coiled spring 10.

Special means are provided for producing elevation of the outer extremity of the arm 13ᵇ, and for releasing the lever to permit effective action of the coiled spring 10. Such means comprise primarily an arm 17, which is pivoted at 18 to the arm 13ᵇ adjacent the forward extremity of the latter. The arm 17 is provided at one extremity with a roller 19 arranged to ride on a collar 20 secured to the shaft 1, and on a cam 21 extending radially from the collar and shaft.

Means for instantaneously stopping rotation of the shaft, after a rotating impulse has been imparted thereto, comprise a clutch disk 22 having a face 23 of suitable frictional material. This brake disk surrounds the shaft 1, and is secured to rods 24. These rods 24 have a screw threaded engagement with other rods 25, which are rigidly engaged with a plate 26.

With the bell crank lever 13 in released or inoperative position, the coiled spring 10 forces slidable clutch member 9 into position to engage the clutch disks 5 and 8, so that movement of rotation of the stationary clutch member 2 is imparted to the shaft.

On one extremity of the shaft 1 is a crank 27, which carries a crank pin 27ᵃ for connection with any mechanical means to which movement is to be imparted. In the partition assembling machine for use with which the present device was initially devised, and for use in various other connections, it is highly desirable that the movement of the shaft be checked after each impulse with the crank pin 28 in exactly the same position, and that the beginning and end of the crank movement be particularly abrupt.

During a single rotation of the shaft 1, arm 17 rides along cam 21, which increases the effective length of the arm. When the operating arm 17 reaches a sufficiently high point of the cam, it forces the arm 14ᵃ of bell crank 13 forwardly to disengage slidable clutch member 9 by moving it axially of the shaft against the resistance of coiled spring 10. This action brings the slidable clutch member into contact with the frictional face 23 of brake disk 22, to instantaneously stop rotation of the shaft 1.

For releasing bell crank 13, and again permitting engagement of the clutch members, means are provided to act on the operating arm 17 to decrease its effective length. As shown, operating arm 17 is formed in two portions which are mutually hinged at 17ᵃ. The tripping means are shown as a squared shaft 28; which is independently rotated, and which may be a timing connection from the machine in conjunction with which the clutch is used. Rotation of this shaft, causes the operating arm 17 to break at its hinged point, as shown in dotted lines in Figure 1, and by decreasing its effective length releases the bell crank 13 so that it no longer acts on the sliding clutch member 9. Coiled spring 10 thus again forces the slidable clutch member 9 away from the brake disk 22, and causes its engagement with the stationary clutch member 2.

The breaking of operating arm 17 decreases its effective length without knocking it from the cam 21, and the lower portion of the operating arm is held in the path of, or upon the face of, the cam by a coiled spring 29 mounted in a brake 30. As shaft 1 begins its rotation the operating arm 17 rides along and off the cam 21, even though it has not rested upon the highest point of the face of such cam in operating the bell crank 13.

As the squared shaft 28 rotates out of contact with operating arm 17, a coiled spring 29, acting on the lower portion of the operating arm, causes it to again assume the vertical position shown in full lines in Figure 1. As the single rotation of the shaft 1 continues, the operating arm rides on the face of cam 21 until it again reaches a point sufficiently high to actuate the bell crank 13.

It should be understood that coiled spring 29 restores the vertical alignment of the portions of actuating arm 17 as soon as the squared shaft 28 rotates out of contact with the operating arm. The operating arm 17, remaining on a high point of the cam 21, thus locks the bell crank 13 in position to prevent mutual engagement of the clutch members 2 and 9.

The adjustable mounting of the brake disk 22 permits wear on the frictional face 23 of this disk to be compensated for, in order that the braking action may be instantaneous, and the movement of rotation of the shaft stopped at exactly the same point after each actuation.

The cam 21, and the collar 20 which carries it, extend radially from the shaft 1, and are held in adjusted position thereon by suitable means such as a set screw 31. This positioning of the cam permits it to be readily adjusted to secure the proper timed operation of the clutch. A wearing of the clutch disks, or of the cam itself may thus be compensated for by circumferential adjustment of the cam on the shaft to which intermittent rotation is imparted.

What we claim is:

1. In clutch mechanism comprising a shaft, a clutch member free on said shaft, a clutch member rotatable with said shaft and movable into and out of engagement with said free member, and means exerting a force constantly tending to produce mutual engagement of said members; the combination of connections for withdrawing the clutch members from mutual engagement, a cam mounted on the shaft and arranged to operate such connections and to maintain them in position to withhold the clutch members from mutual engagement, and means arranged to act on such connections to nullify the action of the cam thereon and permit mutual engagement of the clutch members.

2. In clutch mechanism comprising a shaft, a clutch member free on said shaft, a clutch member rotatable on said shaft and movable into and out of engagement with said free member, means exerting a force constantly tending to produce mutual engagement of said members; the combination of braking means free of said clutch members during mutual engagement thereof, connections for withdrawing the clutch members from mutual engagement and rendering the brake effective to stop rotation of the shaft, and unitary means for operating such connections and for maintaining them in position to prevent rotation of the shaft.

3. In clutch mechanism comprising a shaft, a clutch member free on said shaft, a clutch member rotatable on said shaft and movable into and out of engagement with said free member, means exerting a force constantly tending to produce mutual engagement of said members; the combination of braking means free of said clutch members during mutual engagement thereof, connections for withdrawing the clutch members from mutual engagement and rendering the brake effective to stop rotation of the shaft, and a cam mounted on the shaft and arranged to operate said connections and to maintain them in position to prevent rotation of the shaft.

4. In clutch mechanism comprising a shaft, a clutch member free on said shaft, a clutch member rotatable on said shaft and movable into and out of engagement with said free member, means exerting a force constantly tending to produce mutual engagement of said members; the combination of braking means free of said clutch members during mutual engagement thereof, connections for withdrawing the clutch members from mutual engagement and rendering the brake effective to stop rotation of the shaft, a cam mounted on the shaft and arranged to operate said connections and to maintain them in position to prevent rotation of the shaft, and means arranged to nullify the action of the cam thereon and permit mutual engagement of the clutch members.

5. In clutch mechanism comprising a shaft and mutually engaging fixed and slidable clutch members thereon, a lever for producing disengaging movement of the slidable clutch member, a cam extending radially from the shaft, and an operating arm arranged to ride on the cam to increase its effective length for acting on the lever to disengage the slidable clutch member, the elements being mutually so arranged that rotation of the shaft is stopped with the operating arm on a high point of said cam so that the operating arm locks the lever in disengaging position.

6. In clutch mechanism comprising a shaft and mutually engaging fixed and slidable clutch members thereon, a lever for producing disengaging movement of the slidable clutch member, a cam extending radially from the shaft, and an operating arm arranged to ride on the cam to increase its effective length for acting on the lever to disengage the sliding clutch member, the elements being mutually so arranged that rotation of the shaft is stopped with the operating arm on a high point of said cam so that the operating arm locks the lever in disengaging position, said cam being adjustable circumferentially of the shaft for regulating the action of the operating arm on the disengaging lever.

7. In clutch mechanism comprising a shaft and mutually engaging fixed and slidable clutch members thereon, a lever for producing disengaging movement of the slidable clutch member, a cam extending radially from the shaft, a jointed operating arm arranged to ride on the cam to increase its effective length for acting on the lever to disengage the slidable clutch member, the elements being mutually so arranged that rotation of the shaft is stopped with the operating arm on a high point of said cam so that the operating arm locks the lever in disengaging position, and independent means arranged to act upon the operating arm to decrease the effective length thereof and release the lever.

8. In clutch mechanism comprising a shaft and mutually engaging slidable and fixed clutch members thereon, a lever for producing disengaging movement of the slidable clutch member, a cam extending radially from the shaft, a jointed operating arm arranged to ride on the cam to increase its effective length for acting on the lever to disengage the slidable clutch member, the elements being mutually so arranged that rotation of the shaft is stopped with the operating arm on a high point of said cam so that the operating arm locks the lever in disengaging position, said cam being adjustable circumferentially of the shaft for regulating the action of the operating arm on the disengaging lever, and independent means arranged to act upon the operating arm to decrease the effective length thereof and release the lever.

9. In clutch mechanism comprising a shaft and mutually engaging fixed and slidable clutch members thereon, a brake adjustable in the path of movement of the slidable clutch member and free of such member during its engagement with the fixed member, and a shifting lever arranged to act on said slidable member to disengage it from the stationary clutch member and bring it into contact with the brake.

10. In clutch mechanism comprising a shaft and mutually engaging stationary and slidable clutch members thereon, a brake adjustable in the path of movement of the slidable clutch member and free of such member during its engagement with the stationary member, a shifting lever for disengaging the slidable clutch member from the stationary clutch member, a cam extending radially from the shaft, and for bringing it into contact with the brake and an operating arm connected with the shifting lever and arranged to ride upon the cam for increasing its effective length to actuate the shifting lever, said cam and operating arm being so arranged that the arm remains on a high point of the cam to lock the lever after actuation thereof.

11. In clutch mechanism comprising a shaft and mutually engaging stationary and slidable clutch members thereon, a brake adjustable in the path of movement of the slidable clutch member and free of such member during its engagement with the stationary member, a shifting lever for disengaging the slidable clutch member from the stationary clutch member, and for bringing it into contact with the brake, a cam extending radially from the shaft, an operating arm connected with the shifting lever and arranged to ride upon the cam for increasing its effective length to actuate the shifting lever, said cam and arm being so arranged that the arm remains on a high part of the cam to lock the lever after actuation thereof, and independent means for decreasing the effective length of the operating arm and releasing the lever.

12. In clutch mechanism comprising a shaft and mutually engaging stationary and slidable clutch members thereon, a brake adjustable in the path of movement of the slidable clutch member and free of such member during its engagement with the stationary clutch member, a shifting lever for disengaging the slidable clutch member from the stationary clutch member and for bringing it into contact with the brake, a cam extending radially from the shaft, a jointed operating arm arranged to ride upon the cam for increasing its effective length to actuate the shifting lever, said cam and arm being so arranged that the arm remains on a high part of the cam to lock the lever after actuation thereof, and independent means arranged to act upon the arm to decrease the effective length thereof and release the lever without removing the operating arm from the cam.

13. In clutch mechanism comprising a shaft and mutually engaging stationary and slidable clutch members thereon, a brake adjustable in the path of movement of the slidable clutch member and free thereof during its engagement with the stationary clutch member, a shifting lever for disengaging the slidable clutch member from the stationary clutch member and for bringing it into contact with the brake, a cam extending radially from the shaft, and an operating arm connected with the shifting lever and arranged to ride upon the cam for increasing its effective length to actuate the shifting lever, said cam and operating arm being so arranged that the arm remains on a high point of the cam to lock the lever after actuation thereof, and said cam being adjustable circumferentially of the shaft.

In witness whereof, we hereunto set our hands.

VERNER M. WADE.
CHARLES E. ZUSPAN.